(12) United States Patent
Lo et al.

(10) Patent No.: US 8,500,292 B2
(45) Date of Patent: Aug. 6, 2013

(54) PANEL DISPLAY MODULE AND MANUFACTURING METHOD THEREOF

(75) Inventors: Su Lo, Hsin-Chu (TW); Ching-Chieh Pai, Hsin-Chu (TW); Yung-Chih Liu, Hsin-Chu (TW); Ren-Wei Huang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 446 days.

(21) Appl. No.: 13/018,674

(22) Filed: Feb. 1, 2011

(65) Prior Publication Data

US 2011/0235364 A1  Sep. 29, 2011

(30) Foreign Application Priority Data

Mar. 25, 2010 (TW) .............................. 99108898 A

(51) Int. Cl.
*G02F 1/13357* (2006.01)
(52) U.S. Cl.
USPC ........................................ 362/97.2; 362/627

(58) Field of Classification Search
USPC .................................. 362/627, 632, 633, 97.2
See application file for complete search history.

(56) References Cited

U.S. PATENT DOCUMENTS 5,150,231 A * 9/1992 Iwamoto et al. ................ 349/60
2007/0292983 A1   12/2007 Kriman

* cited by examiner

*Primary Examiner* — David V Bruce
(74) *Attorney, Agent, or Firm* — McClure, Qualey & Rodack, LLP

(57) ABSTRACT

A panel display module and a manufacture method thereof are disclosed. The panel display includes a backlight module, a display panel, a clear cover, and reinforced glue. The backlight module has a light source module and a frame that positions the light source module and other elements to provide structural protection. The display panel is disposed on the light exiting side of the light source module. The clear cover is disposed on one side of the display panel opposite to the light source module. The reinforced glue is distributed encircling the frame and adheres respectively to the frame and to the portion of the clear cover protruding over the display panel. The reinforced glue has a first side adhering onto the frame and a second side adhering onto the clear cover.

35 Claims, 12 Drawing Sheets

PANEL DISPLAY MODULE AND MANUFACTURING METHOD THEREOF

BACKGROUND OF THE INVENTION

1. Field of the Invention

The present invention generally relates to a panel display module.

Particularly, the present invention relates to a reinforced structure for panel display module and a manufacture method thereof.

2. Description of the Prior Art

Liquid crystal display (LCD) panels and numerous alternative display panels have been used in various electronic devices. In the past few years in particular, handheld electronic devices have been reinvigorated with liquid crystal display panels. Mobile phones, personal digital assistants, laptop computers, hand-held entertainment devices, and digital cameras are examples of devices that have practical use of liquid crystal displays to further enhance image effects. However, because unavoidable mishaps from external forces on the electronic devices by the users are bound to occur, the structural integrity of display panels has become an important product design consideration.

FIG. 1A and FIG. 1B illustrate a conventional LCD device. The conventional LCD device includes a backlight module 10, a liquid crystal panel 30, and a protective panel 50. The backlight module 10 includes a plastic frame 11, as well as a light guide plate (LGP) 13 and a light source 15 that are disposed within the plastic frame 11. The liquid crystal panel 30 is disposed within the plastic frame 11 and above the backlight module 10. The protective panel 50 is attached implicitly onto the liquid crystal panel 30 through an adhesive layer 70.

Protective panel 50 will usually cover the internal components, simultaneously increasing the outer visual appeal of the product appearance. Therefore, protective panel 50 will usually extend further out from liquid crystal panel 30 and backlight module 10. When an external force is applied to protective panel 50, due to the fact that protective panel 50 is connected only to liquid crystal panel 30, protective panel 50 will have a pulling effect on liquid crystal panel 30 as well. The result of the pulling effect is that liquid crystal panel 30 will separate from backlight module 10. In addition, since protective panel 50 is connected to liquid crystal panel 30, most of the stress is concentrated on liquid crystal panel 30, and therefore liquid crystal panel 30 is more susceptible to damage as a result.

SUMMARY OF THE INVENTION

It is an object of the present invention to provide a panel display module having higher structural integrity and a manufacturing process thereof.

It is another object of the present invention to provide a panel display module and a manufacture method thereof that allows the panel display module to avoid the display panel included therein from damage.

It is yet another object of the present invention to provide a panel display module and a manufacture method thereof that allows the display panel to avoid separation from or movement relative to the backlight module.

The panel display module includes a backlight module, a display panel, a clear cover, and reinforced glue. The backlight module has a frame and a light source module. The light source module is disposed within the frame and encircled by the frame. The frame can define the position of the light source module and the position of any other internal components and provides structural protection. The display panel is disposed within the frame on the light exiting side of the light source. The clear cover is disposed and glued on the side of the display panel opposite to the light source module.

The reinforced glue is distributed encircling the frame and adheres the frame and the clear cover on the portions protruding from the display panel. The reinforced glue has a first side and a second side adhering to the frame and the clear cover, respectively. When the panel display module experiences an external force, the reinforced glue can increase the stability of the positional relationship between the clear cover and the frame while preventing the display panel from separation from or movement relative to the frame induced by the pulling of the clear cover.

DETAILED DESCRIPTION OF THE PREFERRED EMBODIMENT

The present invention provides a panel display module and a manufacturing method thereof. In addition, the present invention also includes electronic devices incorporating the above mentioned panel display module. In a preferred embodiment, electronic devices using the panel display module include mobile phones, personal digital assistants (PDAs), laptop computers, personal computers, digital compact dictionaries, handheld entertainment devices, digital cameras, et cetera.

Figure 1A:
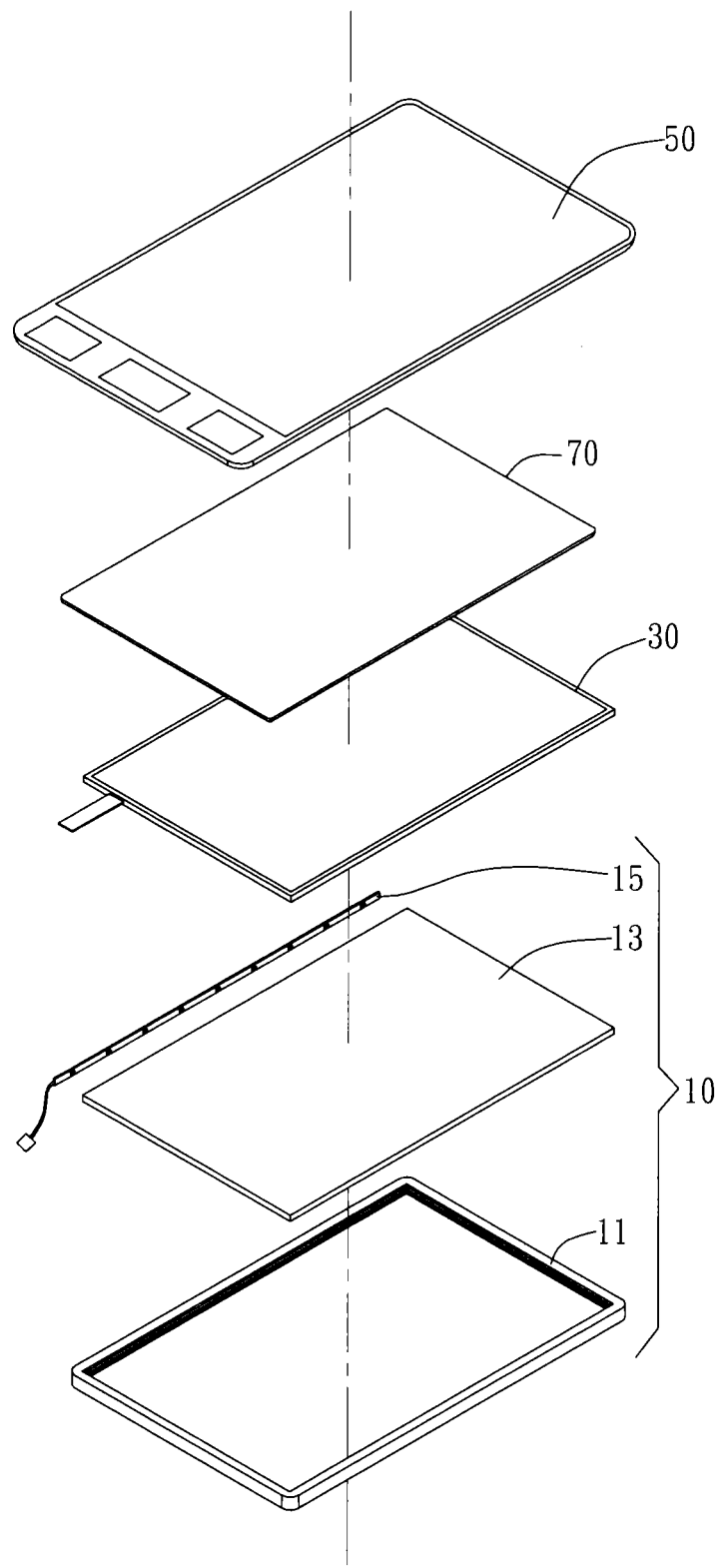
FIG. 1A is an exploded view of the conventional liquid crystal display panel.
Figure 1B:
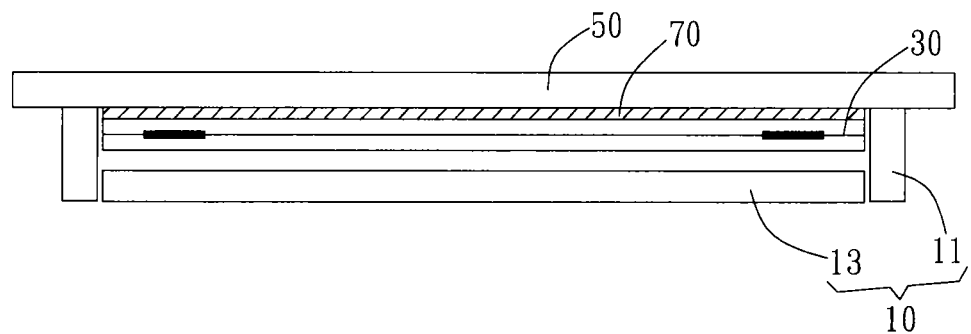
FIG. 1B is a cross-sectional view of the conventional liquid crystal display panel.
Figure 2:
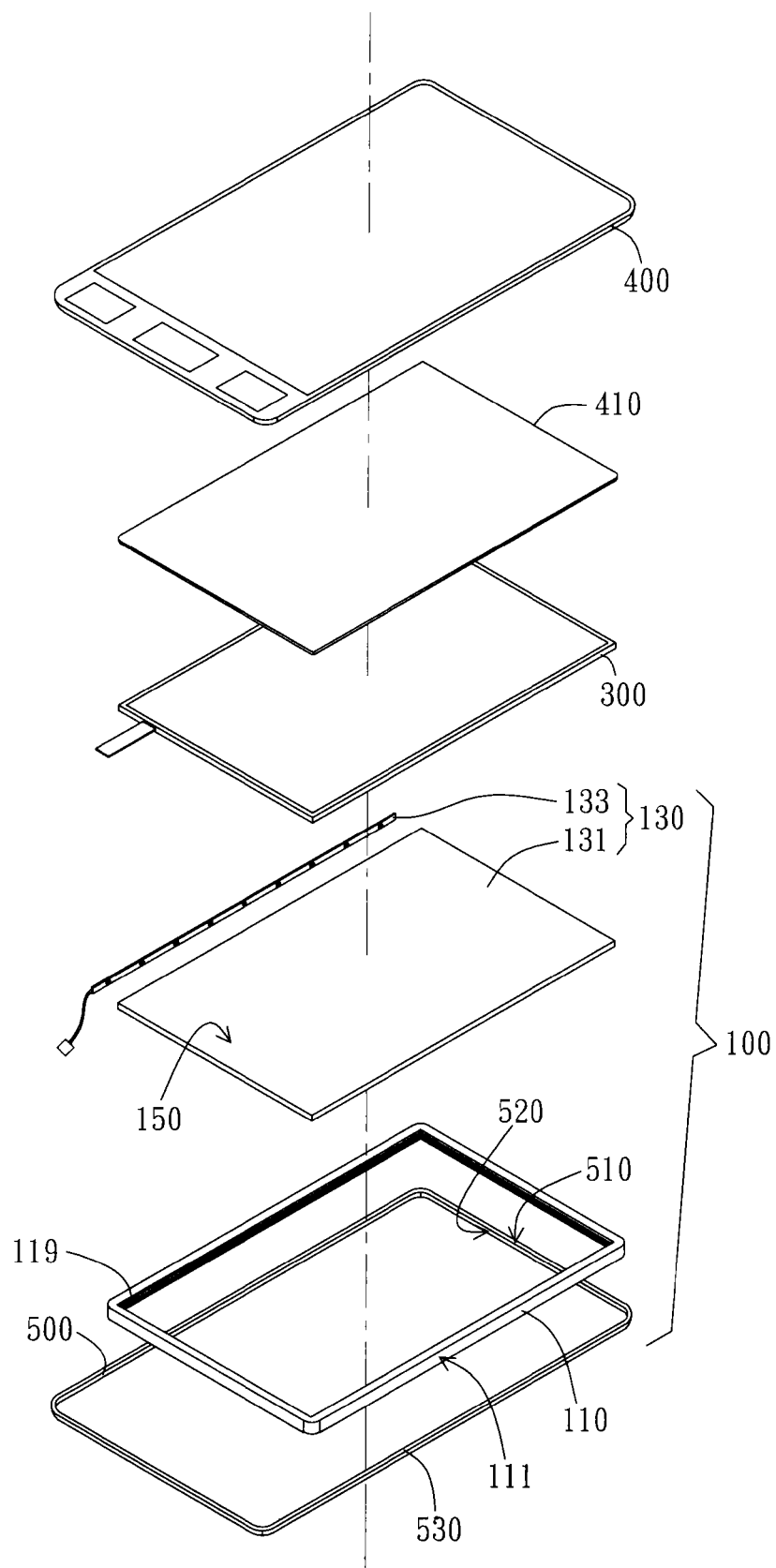
FIG. 2 is an exploded view of one embodiment of the panel display module.

As shown in FIG. 2, the panel display module includes a backlight module 100, a display panel 300, a clear cover 400, and reinforced glue 500. Backlight module 100 has a frame 110 and a light source module 130. Frame 110 is preferably made of plastic or polymer materials. However, in other embodiments, frame 110 can be made of metal or other materials. In the present embodiment, light source module 130 is implemented with edge type light source module and includes a light guide plate 131 and a light source 133. Light source 133 is disposed beside the light guide plate 131 and emits light towards the light guide plate 131. Light travels in light guide plate 131 and emits out from the light exit face 150. Preferably, the light source 133 is a light bar consisting of light-emitting diodes. However, in other embodiments, the light source 133 may be implemented with cathode-ray light tubes or other alternative light sources. In addition, light source module 130 may be implemented as a direct type light source module to omit the light guide plate 131. In this instance, the light exit face panel 150 will be the upmost film of the direct type light source module. As shown in FIG. 2, the light source module 130 is disposed in the frame 110 and encircled by the fame 110. Frame 110 can define the positions of light source 130 and other internal components therein to provide structural protection. In the present embodiment, the top of frame 110 is higher than the light source module 130.

As shown in FIG. 2, the display panel 300 is disposed on the light exiting side of the light source module 130, i.e. on the side where the light exit face 150 is. Preferably, the display panel 300 is also disposed within the frame 110. In the present embodiment, the display panel 300 is a liquid crystal panel. However, in other embodiments, the display panel 300 may be electrophoretic display panels or any other alternative display panels. In the instance that display panel 300 is self-luminous or reflective type liquid crystal panel, the backlight module 100 can be omitted. In the present embodiment, the surface of the display panel 300 is aligned with the top of the frame 110. That is, the surface of the display panel 300 and the top of the frame 110 are coplanar. However, in other embodiments, the surface of display panel 300 may protrude over or be less than the top of frame 110. In addition, in the present embodiment, the inner wall of frame 110 has a protruding rib 119 to provide support to the display panel 300. However, in other embodiments, the display panel 300 may be directly disposed on top of the backlight module 100 without implementing the protruding rib 119.

Figure 3:
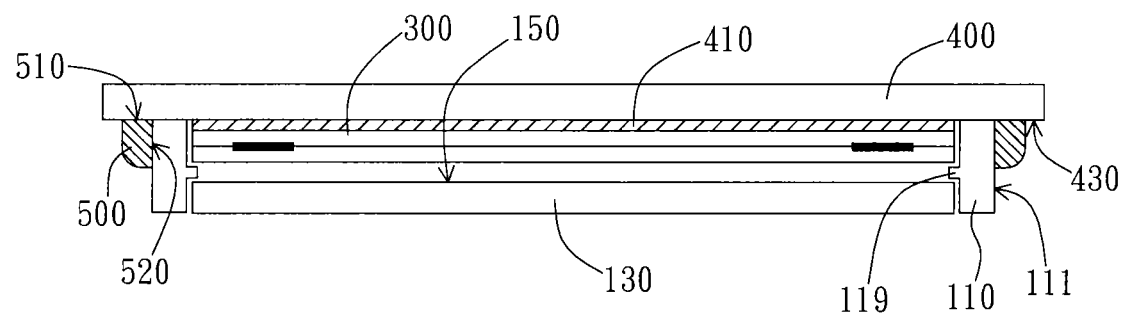
FIG. 3 is a cross-sectional view of one embodiment of the panel display module of the present invention.

Referring to FIG. 2 and FIG. 3, the clear cover 400 is disposed on the side of display panel 300 opposite to the light source module 130 and attached to the display panel 300. In the present embodiment, the clear cover 400 is attached to the display panel 300 by way of a transparent adhesive layer 410. Transparent adhesive layer 410 is evenly distributed between the display panel 300 and the clear cover 400 and covers the display area of the display panel 300. The transparent adhesive layer 410 is preferably attached between the display panel 300 and the clear cover 400 in form of adhesive film or applied onto the display panel 300 or the clear cover 400 as a liquid coating. The clear cover 400 is preferably made of transparent plastic. However, in other embodiments, the clear cover 400 may be made of glass or other alternative transparent materials. In addition, in order to conceal the gaps between the display panel 300 and neighboring structures, the edge of the clear cover 400 protrudes over the edge of display panel 300.

Reinforced glue 500 is preferably a light curable adhesive, a thermal curable adhesive, or a silicone based adhesive material. As shown in FIG. 2 and FIG. 3, reinforced glue 500 is distributed encircling the frame 110 and adheres the frame 110 and the clear cover 400 on the portions protruding over the display panel 300. In the embodiment depicted in FIG. 2, reinforced glue 500 is continuously distributed encircling the frame 110 in a closed loop pattern. However, in other embodiments, reinforced glue 500 need not be distributed in a continuous fashion. For instance, reinforced glue 500 may be distributed encircling frame 110 in a dotted or segmented fashion. Reinforced glue 500 may even be distributed on frame 110 at specific locations in dotted or segmented fashion for local enhancement. Upon receiving external forces to the panel display module, reinforced glue 500 can increase the stability of positional relationship between the clear cover 500 and the frame 110. Simultaneously, reinforced glue 500 can prevent the display panel 300 from movement relative to or separation from the frame 110 induced by the pulling of the clear cover 400. Without the reinforced glue 500, the display panel 300 might have separated from or moved relative to the frame 110 as a result of the pulling force on display panel 300 by the clear cover 400.

Reinforced glue 500 has a first side 510 and a second side 520, glued to the clear cover 400 and the frame 110, respectively. In the present embodiment, as depicted in FIG. 3, the second side 520 of reinforced glue 500 is glued to outer side wall 111 of the frame 110. The first side 510 is glued to the surface portion 430 of the clear cover 400 that faces the frame 110 and protrudes outside the frame 110. In this instance, the first side 510 and the second side 520 ideally are in perpendicular positions. However, in other embodiments, since the outer side wall 111 of frame 110 may be slanted, or the surface portion 430 of clear cover 400 facing the frame 110 may be a curved face, the first side 510 and the second side 520 may possibly not be in perpendicular positions.

Figure 4A:
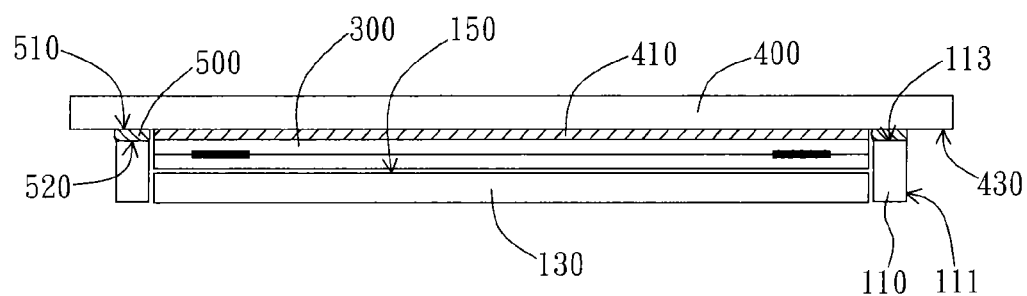
FIG. 4A is a cross-sectional view of one embodiment showing the reinforced glue disposed between the clear cover and the frame.

In the embodiment shown in FIG. 4A, reinforced glue 500 is disposed between the clear cover 400 and the top face 113 of the frame 110. At this instance, the first side 510 of reinforced glue 500 is glued to the surface portion 430 of the clear cover 400 that faces the frame 110 and protrudes above the frame 110. The second side 520 of the reinforced glue 500 is glued to the top face 113 of the frame 110. In this instance, the first side 510 and the second side 520 of the reinforced glue 500 are parallel to each other. Upon experiencing external pulling forces, the reinforced glue 500 more easily absorbs the force perpendicular to the first side 510 and the second side 520 of the reinforced glue 500.

Figure 4B:
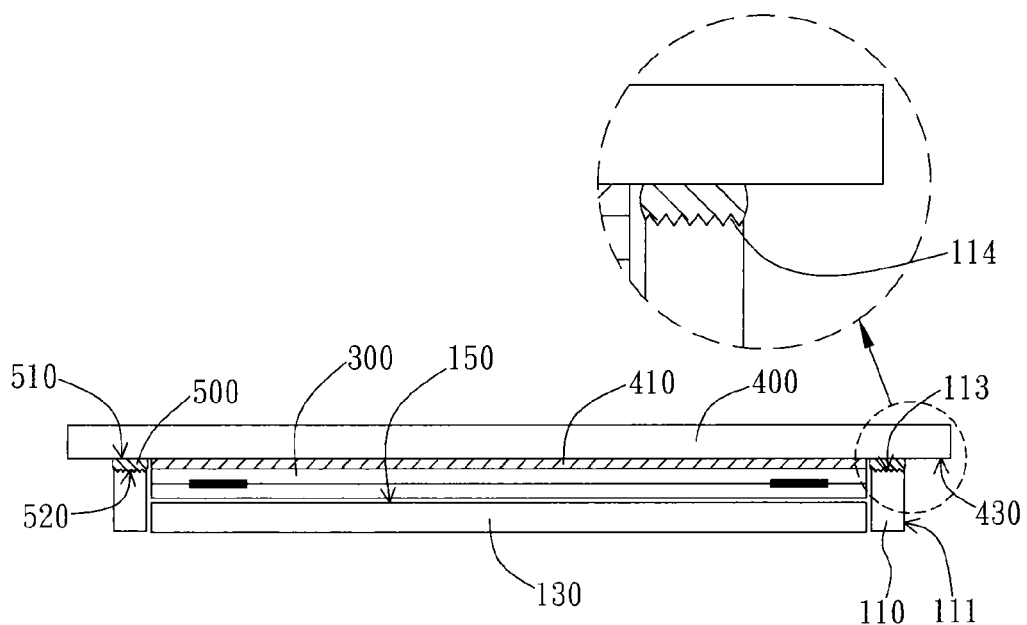
FIG. 4B is a cross-sectional view of one embodiment showing a rough top face.

In addition, as shown in FIG. 4B, a plurality of microstructures 114 may be formed on the top face 113, while the reinforced glue 500 fills the gaps between the microstructures 114, resulting in the engagement of reinforced glue 500 and microstructures 114. Through this design, top face 113 can be a rough surface, increasing the surface area that the second side 520 comes in contact with the top face 113, resulting in increased adhesion strength between the second side 520 and the top face 113. The microstructure 114 is preferably a triangular column formed on the top face 113 and parallel to the extension direction of the frame 110. However, in other embodiments, the microstructure 114 may be of columnar structure of different form, shape, or textual surface distributed in other directions. In addition, the microstructure 114 may be of irregular structure, such as a threaded structure.

Figure 5A:
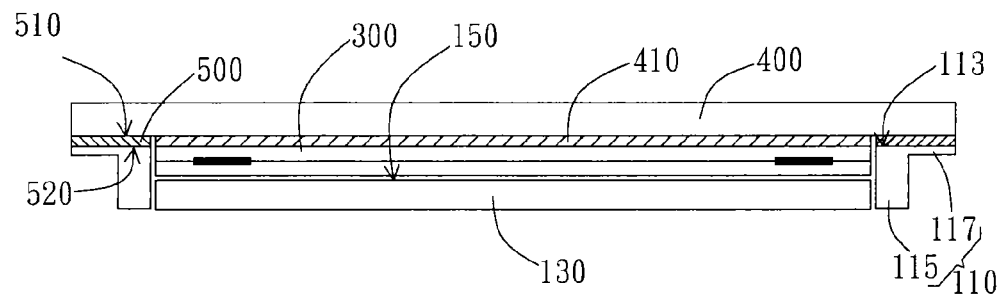
FIG. 5A is a cross-sectional view of one embodiment showing the frame having a flange.

FIG. 5A shows another embodiment of the frame 110. As shown in FIG. 5A, the frame 110 includes side wall 115 and a flange 117. Flange 117 is connected to and extends out from the top end of side wall 115. As seen in FIG. 5A, the cross section of side wall 115 and flange 117 forms an upside-down "L" configuration. In the present embodiment, the side of flange 117 facing the clear cover 400 forms the top face 113 of the frame 110, while reinforced glue 500 is distributed between the top face 113 and the surface portion 430 of the clear cover 400, the surface portion 430 faces the top face 113. Since the flange 117 extends parallel along the clear cover 400, so that the surface area of top face 113 is increased. In other words, the surface area that the second side 520 of reinforced glue 500 contacts the top face 113 and the surface area that the first side 510 contacts inner surface 430 are increased. Since the contacting surface areas increase, reinforced glue 500 can provide even stronger support to stabilize the positional relationship between the frame 110 and the clear cover 400.

Figure 5B:
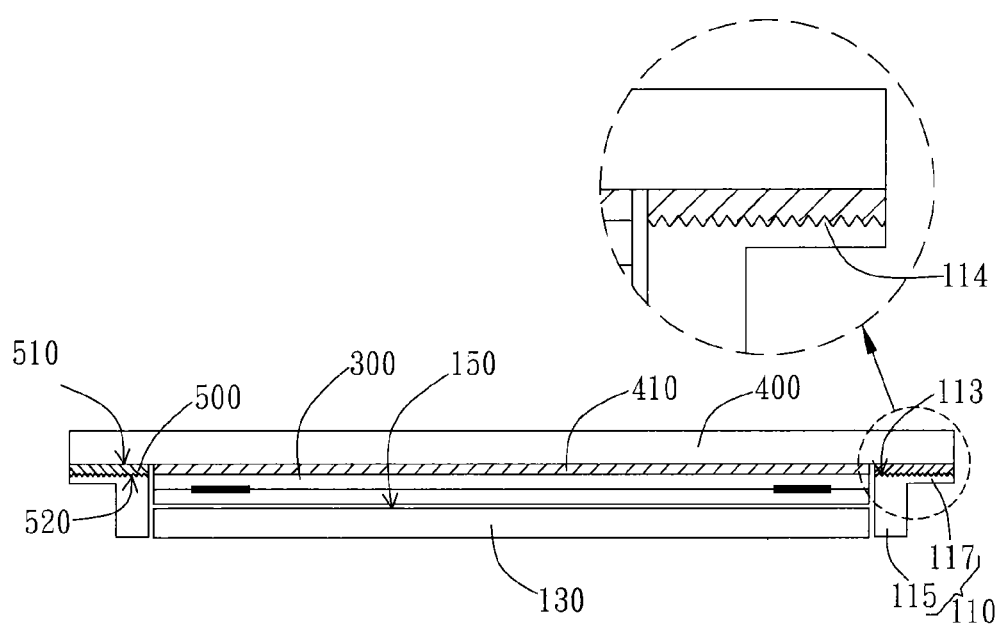
FIG. 5B is a cross-sectional view of one embodiment showing the top face of the flange as a rough face.

In addition, as shown in FIG. 5B, a plurality of microstructures 114 may be formed on the top face 113, while the reinforced glue 500 fills the gaps between the microstructures 114, resulting in the engagement of reinforced glue 500 and microstructures 114. Through this design, top face 113 can be a rough surface, increasing the surface area that the second side 520 comes in contact with the top face 113, resulting in increased connection strength between the second side 520 and top face 113. The microstructure 114 is preferably a triangular column formed on the top face 113 and parallel to the extension direction of the frame 110. However, in other embodiments, the microstructure 114 may be of columnar structure of different form, shape, or textual surface distributed in other directions. In addition, the microstructure 114 may be of irregular structure, such as a threaded structure.

Figure 6A:
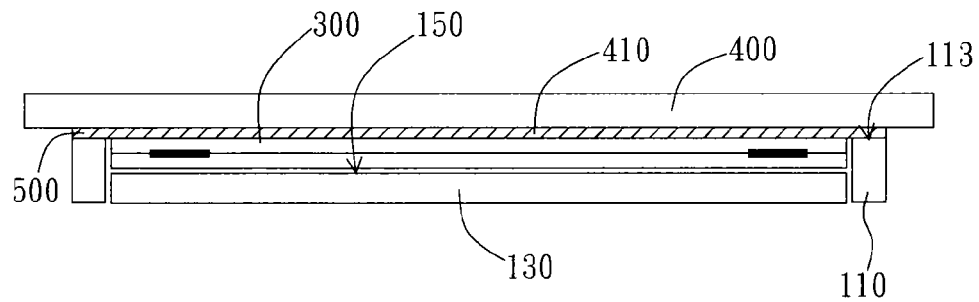
FIG. 6A and FIG. 6B are cross-sectional views showing the transparent adhesive layer extending out to serve as the reinforced glue.

In the embodiment depicted in FIG. 6A, the transparent adhesive layer 410 disposed between the clear cover 400 and the display panel 300 extends between the clear cover 400 and top face 113 of frame 110. In other words, the middle portion of transparent adhesive layer 410 is glued to the display panel 300 and to the clear cover 400, while the two ends of transparent adhesive layer 410 serve as the reinforced glue 500 and adhere the clear cover 400 and the top face 113 of frame 110. In the present embodiment, the display panel 300 and the top face 113 of frame 110 preferably have similar elevation. Considered from a different perspective, the clear cover 400 is glued to the display panel 300 and the backlight module 100 through the transparent adhesive layer 410, enhancing the uniform movement of the display panel 300 and the backlight module 100 while reducing the separation of the display panel 300 and the backlight module 100.

Figure 6B:
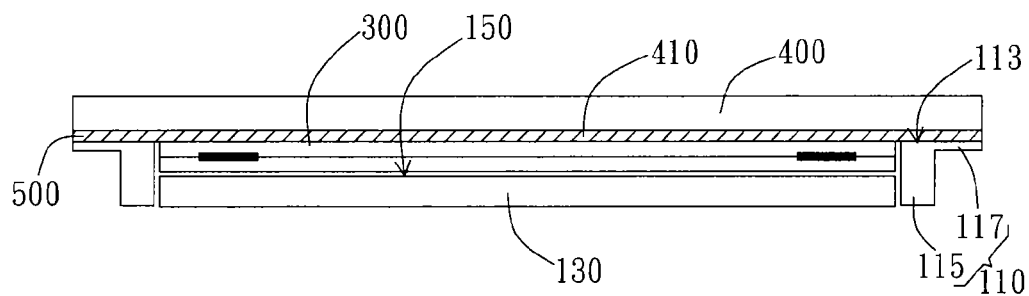

As shown in FIG. 6B, frame 110 includes side wall 115 and flange 117. Flange 117 is connected to and extends out from the top end of side wall 115. In the present embodiment, the side of flange 117 facing the clear cover 400 forms the top face 113 of the frame 110, while the transparent adhesive layer 410 extends from its end to the space between top face 113 and the surface portion 430 of the clear cover 400 that faces the top face 113. Since the surface area of top face 113 is relatively larger, the adhesion strength between the frame 110 and the clear cover 400 can be effectively increased. Upon experiencing an external force, the adhesive between frame 110 and clear cover 400 shares the burden of force exerted on the connection points of clear cover 400 and display panel 300.

Figure 7:
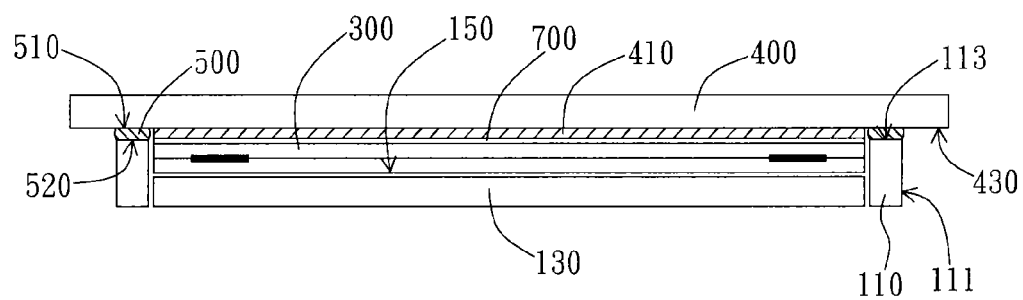
FIG. 7 is a cross-sectional view showing a touch sensitive layer implemented in the present invention.

As shown in FIG. 7, a touch sensitive layer 700 may be added to the display panel 300. Preferably, the touch sensitive layer 700 is disposed on top of the display area of display panel 300. However, in other embodiments, the touch sensitive layer 700 may be disposed within the display panel 300. As shown in FIG. 7, the transparent adhesive layer 410 completely covers the projection region of the touch sensitive layer 700 on the clear cover 400. When using capacitive type touch sensitive layer 700 especially, the touch sensitive layer 700 is more readily able to sense users' touch on the clear cover 400 if the transparent adhesive layer 410 completely covers the projection region of the touch sensitive layer 700.

Figure 8:
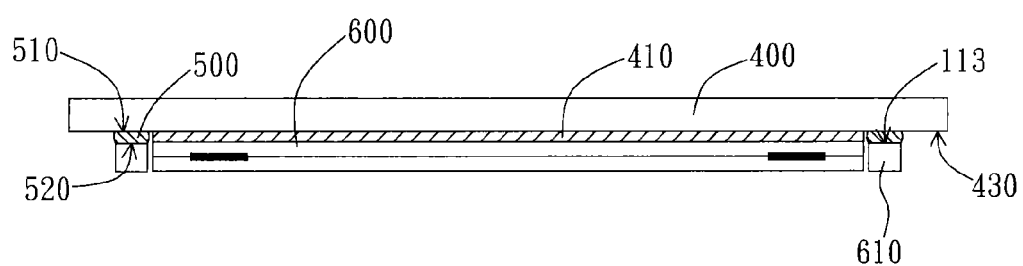
FIG. 8 is a cross-sectional view showing a self-luminous or reflective type display panel implemented in the present invention.

FIG. 8 depicts an embodiment utilizing a self-luminous or reflective type display panel 600. As shown in FIG. 8, display panel 600 is disposed directly within frame 610, wherein no backlight module or related devices are installed. Clear cover 400 covers display panel 600, and reinforced glue 500 enhances the adhesion strength between clear cover 400 and frame 610. The connection relationship between clear cover 400 and frame 610 through the reinforced glue 500 may be modified as described above.

Figure 9A:
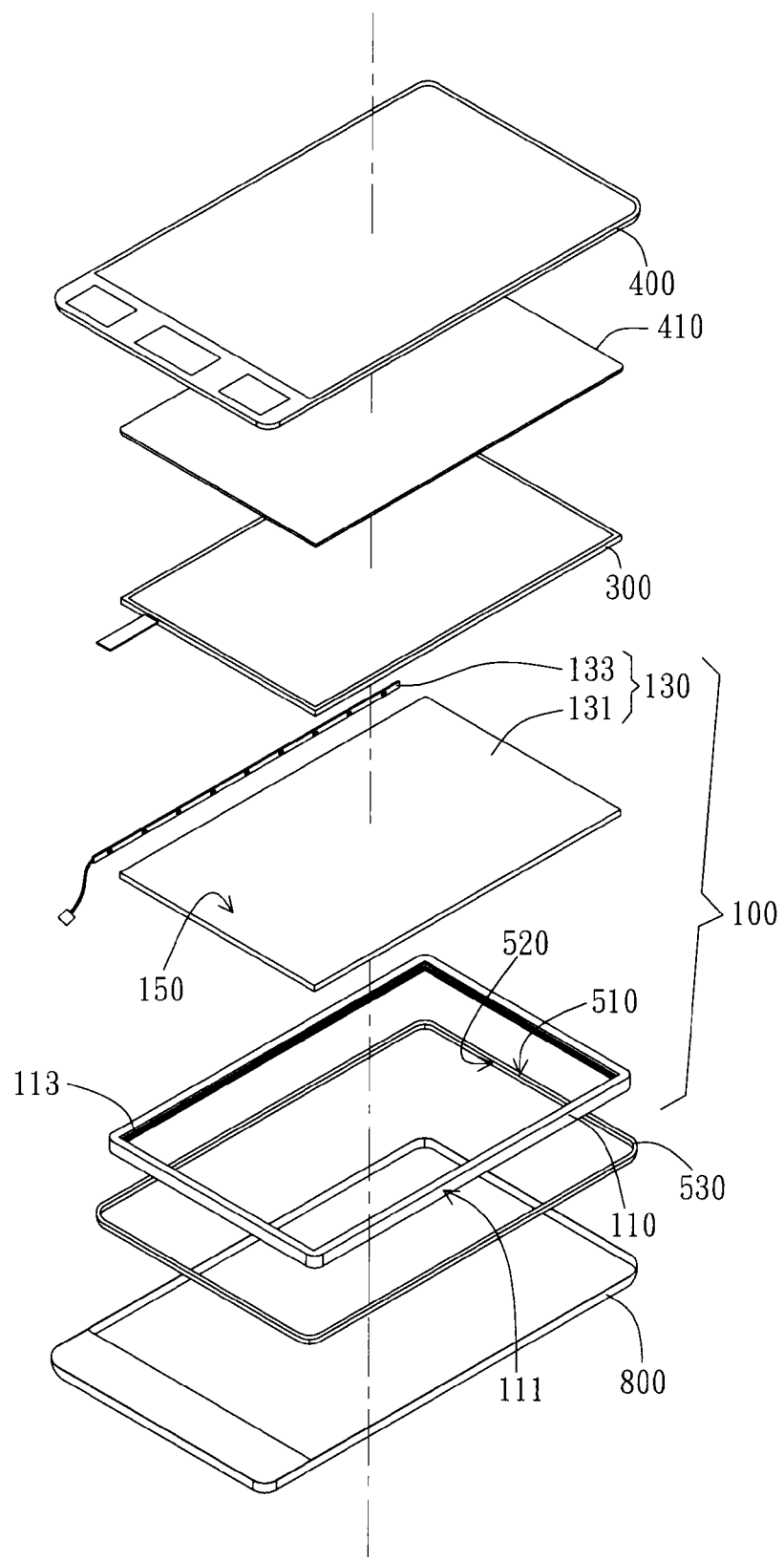
FIG. 9A is an exploded view of an embodiment of the present invention with a casing implemented.
Figure 9B:
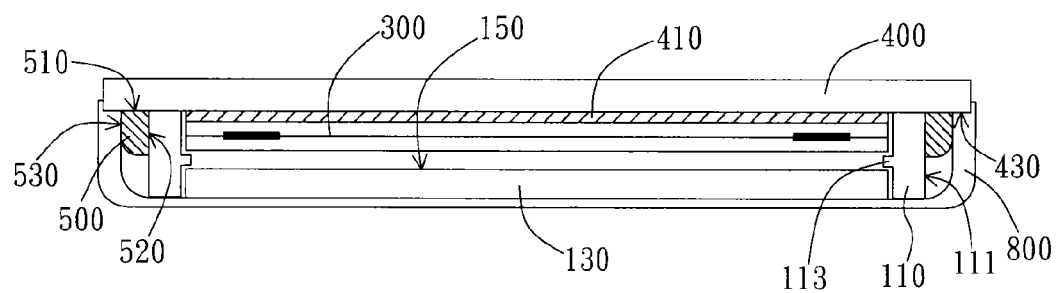
FIG. 9B is a cross-sectional view of the present invention with the casing implemented.

As shown in FIGS. 9A and 9B, the panel display module further includes a casing 800. Casing 800 is preferably the outer casing of an electronic device, so that the panel display module can be combined with the electronic device. However, in other embodiments, casing 800 may act purely as the outer casing of the panel display module. As shown in FIG. 9A and 9B, backlight module 100 is accommodated in the casing 800, and a space is formed between the frame 110 and the casing 800 to accommodate the reinforced glue 500. In the present embodiment, as shown in FIG. 9B, the reinforced glue 500 has a third side 530 facing the inner surface of casing 800. The third side 530 of reinforced glue 500 is glued to the inner surface of casing 800 to provide increased structural integrity. However, in other embodiments, reinforced glue 500 need not be glued to the casing 800 in order to maintain flexibility in the manufacturing process.

In addition, as shown in FIG. 9B, the adhesion strength between third side 530 of reinforced glue 500 and casing 800 is smaller than the adhesion strength between first side 510 and clear cover 400 or smaller than the adhesion strength between second side 520 of reinforced glue 500 and frame 110. Third side 530 may even just come in contact with casing 800 without any adhesion force. In such a case, the reinforced glue 500 serves as filler to fill the space between casing 800 and frame 110 and increase the stability of entire structure. By means of such a design, flexibility of the assembly process can be effectively raised and the possibility of rework may be increased. However, in other embodiments, the adhesion strength between third side 530 of reinforced glue 500 and casing 800 may be comparable to the adhesion strength of other two sides in order to increase structural integrity.

Figure 10:
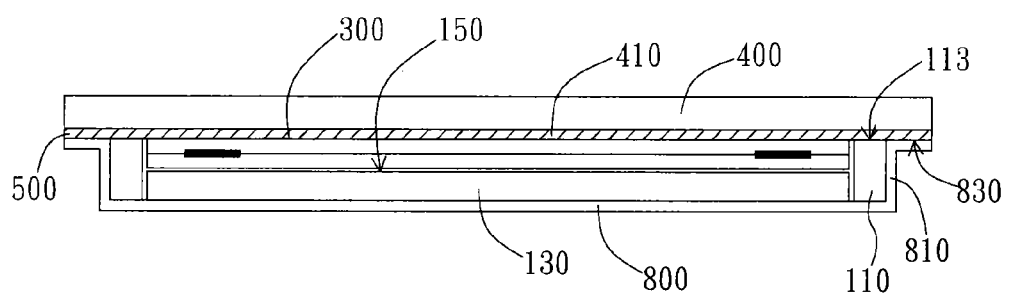
FIG. 10 is a cross-sectional view of one embodiment showing the casing extending to form a platform.

As shown in FIG. 10, casing 800 has side wall 810, wherein the top end thereof is bent outward to form a platform 830. The transparent adhesive layer 410 extends between frame 110 and clear cover 400 and further between platform 830 and clear cover 400, so that platform 830 and clear cover 400 are adhered together. With such a design, display panel 300, backlight module 100, and casing 800 are attached onto the clear cover 400 by transparent adhesive layer 410. Therefore, external force exerted on clear cover 400 can be dispersed through display panel 300, backlight module 100, and casing 800 to prevent the force from being concentrated on particular spot.

Figure 11:
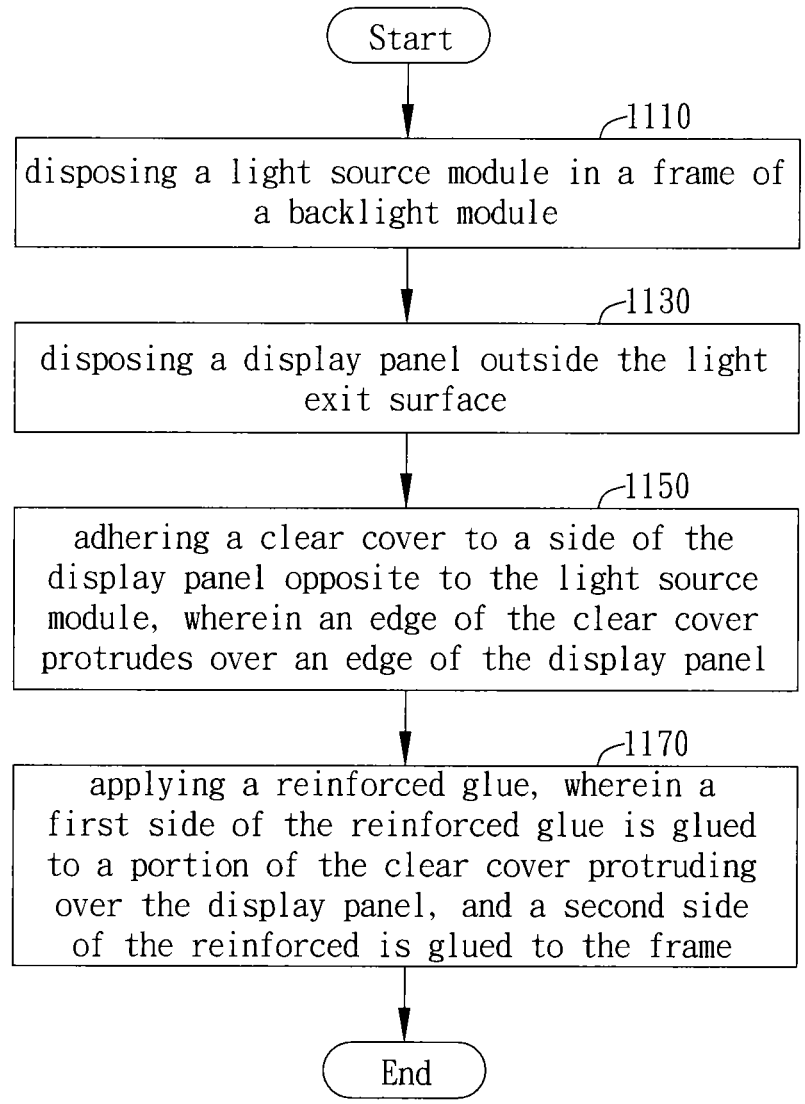
FIGS. 11 and 12 are flowcharts showing the manufacturing method of the panel display module.

FIG. 11 shows a flowchart of the manufacturing method of the panel display module. Step 1110 includes disposing light source module in the frame of the backlight module. As mentioned above, the light source module may be direct type or edge type light source module. In the instance of edge type, installation of a light guide plate and a light source would be required. In the instance of direct type, installation of the necessary optical films above the light source would be required. Step 1130 includes disposing the display panel on the light exiting side of the light source module. In preferable embodiments, a touch sensitive layer can be disposed above or within the display panel, wherein the step of disposing the touch sensitive layer is performed before step 1130.

Step 1150 includes attaching the clear cover to a surface of the display panel, wherein the surface is opposite to the light source module, so that the edge of the clear cover extends over the edge of the display panel. In preferable embodiments, a transparent adhesive layer is disposed between the display panel and the clear cover and glues the display panel and the clear cover together. The step of disposing the transparent adhesive layer preferably includes attaching an adhesive film or coating a liquid layer. In instances of embodiments with a touch sensitive layer, the transparent adhesive layer is preferably disposed to completely cover the projection region of the touch sensitive layer on the clear cover, thus allowing the touch sensitive layer to accurately detect touch operations on the clear cover.

Step 1170 includes applying the reinforced glue, so that a first side of the reinforced glue is glued to the portion of the clear cover protruding over the display panel, and a second side of the reinforced glue is glued to the frame of the backlight module. The reinforced glue is preferably distributed encircling the frame in a continuous coating or non-continuous dotted application. In preferable embodiments, the reinforced glue is disposed on the outer side of the frame, allowing the second side of the reinforced glue to be glued to the outer wall of the frame. However, in other embodiments, the reinforced glue may be disposed between the top face of the frame and the inner surface of the clear cover. In this instance, the first side of reinforced glue is glued to the inner surface of the clear cover while the second side of the reinforced glue is glued to the top face of the frame. Moreover, when the top of the side wall of the frame forms a flange, the reinforced glue may be disposed between the flange and the clear cover.

In step 1170, the transparent adhesive layer disposed between the display panel and the clear cover may extend between the clear cover and the top face of the frame to serve as the reinforced glue. In the present embodiment, first, the transparent adhesive layer is preferably attached or coated onto the clear cover, and then the clear cover is assembled with the display panel and frame in order to create adhesion connections.

Figure 12:
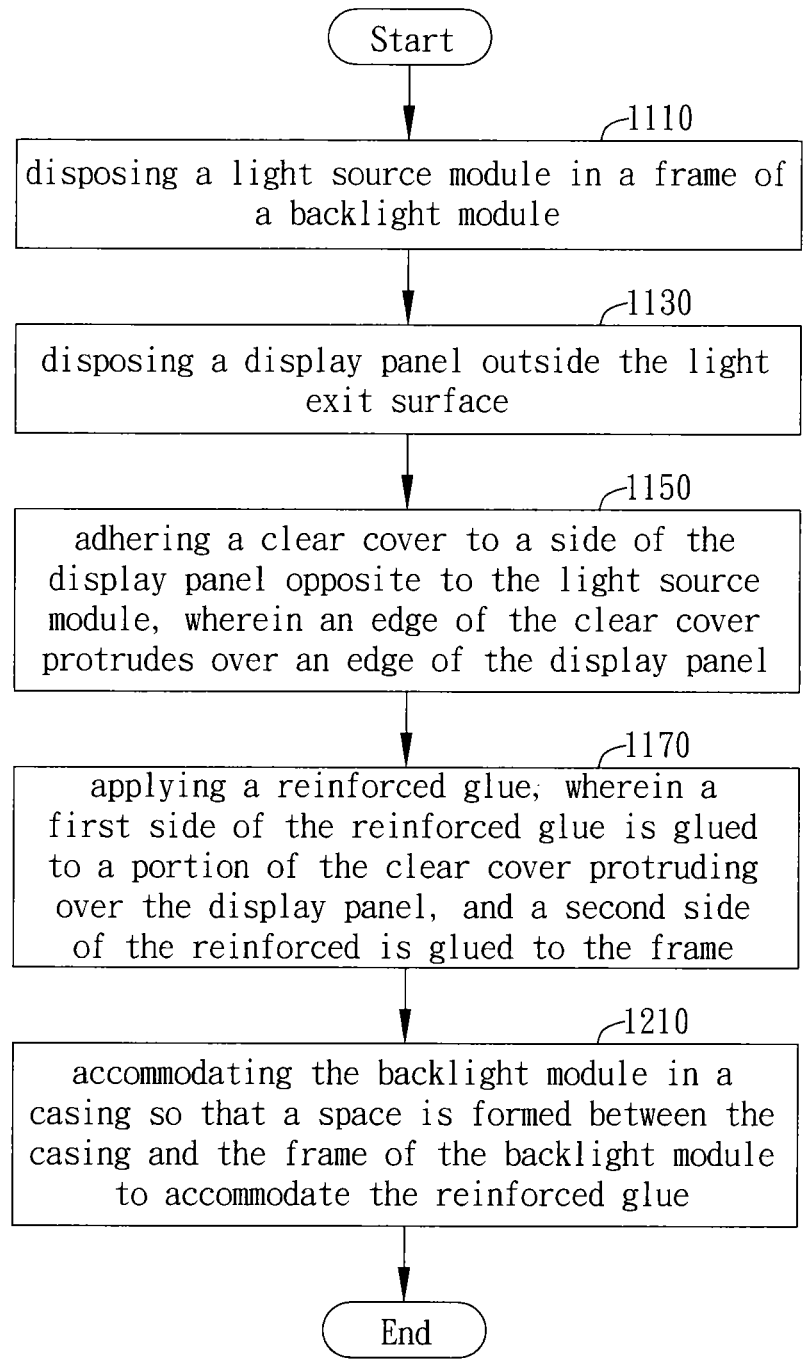

As shown in FIG. 12, Step 1210 further includes disposing the backlight module within the casing, and forming a space between the casing and the frame of the backlight module to accommodate the reinforced glue. In preferable embodiments, a third side of the reinforced glue faces and is glued to the casing. For example, if light-curing based reinforced glue is used, assembly of the casing and backlight module may proceed after the reinforced glue is applied and before the light-curing process is performed. After light-curing the reinforced glue, the third side of the reinforced glue is adhered to the casing. When using reinforced glue based on alternative materials, similar processes may be used to achieve assembly before cementing of the reinforced glue.

However, in other embodiments, the adhesion strength between the third side of the reinforced glue and the casing may be adjusted to levels lower than the adhesion strength between the first side of the reinforced glue and the clear cover as well as the adhesion strength between the second side and the frame. There may possibly not even be any adhesion between contacting surfaces of third side and the casing, relying mainly on the filling and distribution of the reinforced glue in the space between the casing and the frame to increase structural stability. For example, if the reinforced glue is an light-curing adhesive, assembly of the casing and backlight module may be performed after the reinforced glue has light-cured. In this instance, the third side of the reinforced glue would not adhere to the casing. When using other alternative materials to serve as the reinforced glue, similar processes may be adopted to achieve assembly after the reinforced glue cements. Through such a design, the flexibility of the assembly manufacturing process can effectively be raised, increasing the possibility of rework.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A panel display module, comprising:
a backlight module including a frame and a light source module, wherein the light source module has a light exit surface and is disposed within the frame;
a display panel, disposed outside the light exit surface of the light source module;
a clear cover, glued onto a side of the display panel opposite to the light source module, wherein an edge of the clear cover protrudes over an edge of the display panel; and
a reinforced glue having a first side and a second side, wherein the first side is glued to a portion of the clear cover that protrudes over the display panel and the second side is glued to the frame.

2. The panel display module of claim 1, wherein the frame has an outer side wall, the second side of the reinforced glue is glued to the outer side wall.

3. The panel display module of claim 2, wherein the clear cover has an inner surface, a portion of the inner surface protrudes over the outer side wall, the first side of the reinforced glue is glued to the portion of the inner surface protruding over the inner side wall.

4. The panel display module of claim 1, wherein the reinforced glue is distributed encircling the frame.

5. The panel display module of claim 1, wherein the clear cover has an inner surface and the frame has a top face facing the inner surface of the clear cover, the reinforced glue is disposed between the inner surface of the clear cover and the top face with the first side of the reinforced glue glued to the inner surface and the second side glued to the top face.

6. The panel display module of claim 5, wherein the frame comprises a side wall and a flange, the flange connects to the top of the side wall and extends out from the side wall, the top face is disposed on a side of the flange opposite to the clear cover.

7. The panel display module of claim 5, further comprising a transparent adhesive layer disposed between the display panel and the clear cover, wherein a portion of the transparent adhesive layer extends between the inner surface of the clear cover and the top face of the frame to form the reinforced glue.

8. The panel display module of claim 7, further comprising a touch sensitive layer formed within the display panel, wherein the transparent adhesive layer completely covers a projection region of the touch sensitive layer on the clear cover.

9. The panel display module of claim 7, further comprising a casing for accommodating the backlight module, wherein the casing comprises a side wall with a top end bent outward to form a platform, one end of the transparent adhesive layer extends between the platform and the clear cover and adheres to both the platform and the clear cover.

10. The panel display module of claim 5, wherein at least one microstructure is formed on the top face, the reinforced glue fills between the microstructures.

11. The panel display module of claim 1, further comprising a casing for accommodating the backlight module, wherein a space is formed between the casing and the frame to accommodate the reinforced glue.

12. The panel display module of claim 11, wherein the reinforced glue has a third side facing the casing, the third side is glued to the casing.

13. The panel display module of claim 11, wherein the reinforced glue has a third side facing the casing, an adhesion force between the third side and the casing is smaller than an adhesion force between the first side and the clear cover as well as an adhesion force between the second side and the frame.

14. A manufacturing method of a panel display module, comprising:
disposing a light source module in a frame of a backlight module, wherein the light source module has a light exit surface;
disposing a display panel outside the light exit surface;
adhering a clear cover to a side of the display panel opposite to the light source module, wherein an edge of the clear cover protrudes over an edge of the display panel; and
applying a reinforced glue, wherein a first side of the reinforced glue is glued to a portion of the clear cover protruding over the display panel, and a second side of the reinforced is glued to the frame.

15. The manufacturing method of claim 14, wherein the step of applying the reinforced glue comprises adhering the second side of the reinforced to an outer sidewall of the frame.

16. The manufacturing method of claim 14, wherein the step of applying the reinforced glue comprises distributing the reinforced glue to encircle the frame.

17. The manufacturing method of claim 14, wherein the clear cover has an inner surface, the frame has a top face facing the inner surface of the clear cover, the step of applying the reinforced glue comprises disposing the reinforced glue between the inner surface of the clear cover and the top face of the outer frame, so that the first side of the reinforced glue is glued to the inner surface of the clear cover and the second side of the reinforced glue is glued to the top face of the clear cover.

18. The manufacturing method of claim 17, wherein the outer frame comprises a side wall and a flange, the flange is connected to the top of the side wall and extends out from the side wall, the step of applying the reinforced glue comprises disposing the reinforced glue between the inner surface and the portion of the flange extending out from the side wall.

19. The manufacturing method of claim 17, wherein the step of adhering the clear cover comprises disposing the transparent adhesive layer between the display panel and the clear cover to adhere the display panel and the clear cover, the step of applying the reinforced glue comprises extending an end of the transparent adhesive layer between the inner surface of the clear cover and the top face of the frame to form the reinforced glue.

20. The manufacturing method of claim 19, further comprising forming a touch sensitive layer within the display panel, wherein the step of disposing the transparent adhesive layer comprises disposing the transparent adhesive layer to completely cover a projection region of the touch sensitive layer on the clear cover.

21. The manufacturing method of claim 14, further comprising accommodating the backlight module in a casing so that a space is formed between the casing and the frame of the backlight module to accommodate the reinforced glue.

22. The manufacturing method of claim 21, wherein the step of applying the reinforced glue comprises making a third side of the reinforced glue face and be glued to the casing.

23. The manufacturing method of claim 21, wherein the step of applying the reinforced glue comprises making a third side of the reinforced glue face the casing so that an adhesion force between the third side of the reinforced glue and the casing is smaller than an adhesion force between the first side of the reinforced glue and the clear cover as well as an adhesion force between the second side of the reinforced glue and the frame.

24. A panel display module, comprising:
a frame;
a display panel, disposed within the frame;
a clear cover, disposed and glued on the display panel, wherein an edge of the clear cover protrudes over an edge of the display panel; and
a reinforced glue having a first side and a second side, wherein the first side is glued to a portion of the clear cover protruding over the display panel, the second side is glued to the frame.

25. The panel display module of claim 24, wherein the frame has an outer side wall, the second side of the reinforced glue is glued to the outer side wall of the frame.

26. The panel display module of claim 25, wherein the clear cover has an inner surface, a portion of the inner surface protrudes over the outer sidewall, the first side of the reinforced glue is glued to the portion of the inner surface protruding over the outer sidewall.

27. The panel display module of claim 24, wherein the reinforced glue is distributed encircling the frame.

28. The panel display module of claim 24, wherein the clear cover has an inner surface, the frame has a top face facing the inner surface of the clear cover, the reinforced glue is disposed between the inner surface of the clear cover and the top face of the frame, the first side of the reinforced glue is glued to the inner surface of the clear cover, the second side of the reinforced glue is glued to the top face of the frame.

29. The panel display module of claim 28, wherein the outer frame comprises a side wall and a flange, the flange is connected to the top of the side wall and extends out from the side wall, the top face is positioned on a side of the flange facing the clear cover.

30. The panel display module of claim 28, further comprising a transparent adhesive layer disposed between the display panel and the clear cover, wherein an end of the transparent adhesive layer extends between the inner surface of the clear cover and the top face of the outer frame to form the reinforced glue.

31. The panel display module of claim 30, further comprising a touch sensitive layer formed within the display panel, wherein the transparent adhesive layer completely covers a projection region of the touch sensitive layer on the clear cover.

32. The panel display module of claim 28, wherein at least one microstructure is formed on the top face, the reinforced glue fills between the microstructures.

33. The panel display module of claim 24, further comprising a casing for accommodating the frame, wherein a space is formed between the casing and the frame to receive the reinforced glue.

34. The panel display module of claim 33, wherein the reinforced glue has a third side facing the casing, the third side of the reinforced glue is glued to the casing.

35. The panel display module of claim 33, wherein the reinforced glue has a third side facing the casing, an adhesion force between the third side of the reinforced glue and the casing is smaller than an adhesion force between the first side of the reinforced glue and the clear cover and an adhesion force between the second side of the reinforced glue and the frame.

* * * * *